(12) United States Patent
Jiang et al.

(10) Patent No.: US 10,176,804 B2
(45) Date of Patent: Jan. 8, 2019

(54) ANALYZING TEXTUAL DATA

(71) Applicant: Alibaba Group Holding Limited, George Town (KY)

(72) Inventors: Huixing Jiang, Beijing (CN); Jian Sun, Beijing (CN); Min Chu, Beijing (CN)

(73) Assignee: Alibaba Group Holding Limited (KY)

( * ) Notice: Subject to any disclaimer, the term of this patent is extended or adjusted under 35 U.S.C. 154(b) by 26 days.

(21) Appl. No.: 15/404,855

(22) Filed: Jan. 12, 2017

(65) Prior Publication Data
US 2017/0206897 A1 Jul. 20, 2017

(30) Foreign Application Priority Data

Jan. 18, 2016 (CN) .......................... 2016 1 0031796

(51) Int. Cl.
| | |
|---|---|
| *G10L 15/22* | (2006.01) |
| *G06F 17/27* | (2006.01) |
| *G06F 17/30* | (2006.01) |
| *G10L 13/08* | (2013.01) |
| *G10L 15/04* | (2013.01) |
| *G10L 25/51* | (2013.01) |
| *G10L 15/18* | (2013.01) |

(52) U.S. Cl.
CPC ............ *G10L 15/22* (2013.01); *G06F 17/271* (2013.01); *G06F 17/2765* (2013.01); *G06F 17/30654* (2013.01); *G06F 17/30864* (2013.01); *G10L 13/08* (2013.01); *G10L 15/04* (2013.01); *G10L 25/51* (2013.01); *G10L 15/1815* (2013.01)

(58) Field of Classification Search
None
See application file for complete search history.

(56) References Cited

U.S. PATENT DOCUMENTS

| | | | |
|---|---|---|---|
| 5,519,608 A | 5/1996 | Kupiec | |
| 7,415,409 B2* | 8/2008 | Simoneau | G10L 15/197 379/88.01 |
| 8,417,512 B2* | 4/2013 | Larvet | G06F 17/274 704/1 |
| 9,213,771 B2 | 12/2015 | Chen | |
| 9,483,582 B2* | 11/2016 | Gaucher | G06F 17/30684 |
| 2003/0120639 A1* | 6/2003 | Potok | G06F 17/30569 |
| 2003/0191627 A1* | 10/2003 | Au | G06F 17/2785 704/9 |
| 2006/0224569 A1 | 10/2006 | Desanto | |
| 2007/0209069 A1 | 9/2007 | Saklikar | |
| 2008/0235025 A1* | 9/2008 | Murase | G10L 13/033 704/260 |
| 2009/0204395 A1* | 8/2009 | Kato | G10L 13/033 704/206 |

(Continued)

*Primary Examiner* — Neeraj Sharma
(74) *Attorney, Agent, or Firm* — Van Pelt, Yi & James LLP

(57) ABSTRACT

Analyzing textual data is disclosed, including by: receiving textual data; determining that the textual data is a candidate for analogy analysis based at least in part on at least a portion of the textual data matching an analogical question template; extracting a source substantive from the textual data; using the source substantive to determine a target substantive from a word vector model that is trained on a set of training data; and generating an answer including the target substantive based at least in part on an analogical answer template corresponding to the analogical question template.

17 Claims, 10 Drawing Sheets

(56) References Cited

U.S. PATENT DOCUMENTS

| | | |
|---|---|---|
| 2009/0282114 A1 | 11/2009 | Feng |
| 2011/0143718 A1* | 6/2011 | Engelhart, Sr. ......... G10L 15/26 |
| | | 455/412.1 |
| 2014/0006012 A1 | 1/2014 | Zhou |
| 2014/0136187 A1 | 5/2014 | Wolverton |
| 2014/0272884 A1 | 9/2014 | Allen |
| 2015/0142704 A1* | 5/2015 | London ................... G06N 5/04 |
| | | 706/11 |

* cited by examiner

ANALYZING TEXTUAL DATA

CROSS REFERENCE TO OTHER APPLICATIONS

This application claims priority to People's Republic of China Patent Application No. 201610031796.6 entitled A METHOD AND A DEVICE FOR PROCESSING TEXTUAL DATA filed Jan. 18, 2016 which is incorporated herein by reference for all purposes.

FIELD OF THE INVENTION

The present application relates to the field of text processing technology. In particular, the present application relates to techniques for processing textual data.

BACKGROUND OF THE INVENTION

As the need to provide automated responses to text-based or audio-based questions grows, many automated chat services have appeared on the market.

A rather common problem in spoken or textual answers is the problem of analogies such as "What is the relationship between Little Ming and Little Hong?"

At present, chatbots generally answer analogical questions by deriving the same-class or analogical relationship between two entities on the basis of RDF (Resource Description Framework).

Given that the inter-entity relationship is sought on the basis of an RDF knowledge base, it is necessary to construct a complete RDF knowledge base in advance.

The construction of an RDF knowledge base generally requires three steps that are iteratively performed. For example, the three steps of constructing an RDF knowledge base comprise: uncovering relationship templates through mining, cleaning an encyclopedic range of data, and extracting relationships. This work expends large amounts of effort and physical resources and is also costly. Yet, the coverage is limited and consequently, the success rates of responses to analogical questions are low.

For example, the following is stated in a piece of captured online content: "Andy Lau and Jackie Chan are close friends." Thus, this is what is recorded in the RDF knowledge base: Andy Lau, Jackie Chan, relationship close friends, and other such information.

If an automated chat service receives the question "What is the relationship between Andy Lau and Jackie Chan?" from a user, the automated chat service will find in the RDF knowledge base that the relationship is "close friends" and will answer "close friends."

However, if the automated chat service has not previously captured this piece of content, it will be unable to respond and might avoid the question by answering with a default response, such as, "What is the relationship?"

In addition, RDF-based responses are in a question and answer form. In a chat system, it might not be possible for an automated chat service to come up with an answer. Furthermore, typical automated chat services can provide answers, but typically in a terse and rigid form that appears robotic. A user is more likely to engage in the service longer if the responses are in more natural, human language, such as language that expresses humor or mimics a human's thought process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of analysis of textual data are described herein. Textual data is received. In various embodiments, textual data is converted from user input, such as speech data, text input, etc. In various embodiments, the textual data comprises a question. A source substantive is extracted from the textual data. In various embodiments, a "substantive" comprises a noun (e.g., a proper noun, such as a name of an individual). In various embodiments, a "source substantive" refers to a substantive that is extracted from the received textual data. In various embodiments, a "target substantive" refers to a substantive that is included or to be included in an answer generated for the textual data. The source substantive is used to determine a target substantive from a word vector model that was trained on a set of training data. An answer that includes the target substantive is presented in response to the textual data.

Figure 1:
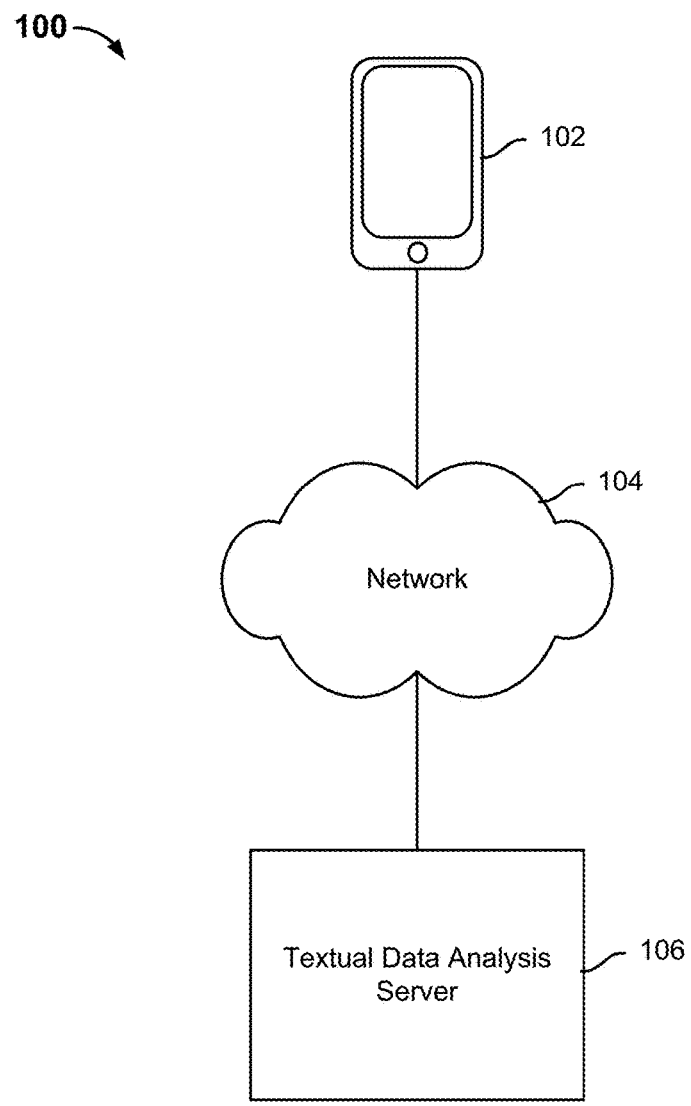
FIG. 1 is a diagram showing an embodiment of a system of analyzing textual data.

FIG. 1 is a diagram showing an embodiment of a system of analyzing textual data. In the example, system 100 includes client device 102, network 104, and textual data analysis server 106. In various embodiments, network 104 comprises one or more of high-speed data and/or telecommunications networks.

In some embodiments, speech data is received by a voice-based assistant application executing at client device 102. For example, the speech data comprises a question that is asked by a user. While client device 102 is shown to be a smartphone in the example of FIG. 1, client device 102 may also comprise a laptop computer, a desktop computer, a tablet device, a smart wearable device (e.g., bracelets, watches, glasses), or any computing device. For example, a user may speak into a microphone or other type of voice-based receiver of client device 102.

In some embodiments, words included in the speech data are recognized as textual words based on automatic speech recognition (ASR). Examples of ASR systems include Google Speech and Ali Cloud Speech. In some embodiments, the ASR technology is implemented at client device 102. After client device 102 converts the speech data into textual data, client device 102 is configured to send the textual data to textual data analysis server 106. In some embodiments, client device 102 sends the received speech data to textual data analysis server 106 over network 104, where textual data analysis server 106 is configured to convert the speech data into textual data using an ASR system.

In some embodiments, the ASR system that performs speech recognition may include one or more of the following modules:

The modules can be implemented as software components executing on one or more processors, as hardware such as programmable logic devices, and/or Application Specific Integrated Circuits designed elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

1. Signal processing and feature extracting module: This module is configured to extract features from the speech data and supply them to the acoustic model for processing. It generally also includes some signal processing technologies for minimizing the effects on the features of factors such as ambient noise, signal channels, and speakers, for example.

2. Acoustic model: The ASR system often builds models based on the first-order hidden Markov model.

3. Pronunciation dictionary: The pronunciation dictionary contains vocabulary and their pronunciations that can be processed by the ASR system. The pronunciation dictionary provides acoustical model and speech model mapping.

4. Language model: The language model does modeling for languages targeted by the ASR system. Theoretically, all kinds of language models, including regular language and context-free grammar, may serve as the language model, but most systems use statistics-based n-gram one and variants thereof.

5. Decoder: The decoder is one of the cores of an ASR system. Its task, with regard to an input signal, is to use acoustic and language models and dictionaries to search for the string that has the highest probability of outputting the signal.

In various embodiments, textual data analysis server 106 is configured to determine whether the textual data is a candidate for analogy analysis. In some embodiments, textual data analysis server 106 determines that textual data is a candidate for analogy analysis by comparing segmented words from the textual data to analogical question templates. For example, if an analogical question template is found to match the words of the textual data, then the textual data is determined to be a candidate for analogy analysis. In some embodiments, each analogical question template corresponds to one or more analogical answer templates. In various embodiments, an analogical answer template comprises one or more placeholder target substantives. In various embodiments, a "placeholder target substantive" comprises a default word, a default variable, or an absence of a word that is to be replaced with a determined target substantive. In various embodiments, textual data analysis server 106 is configured to select an analogical answer template corresponding to the matching analogical question template and determine a target substantive to replace each placeholder target substantive of the analogical answer template based at least in part on the one or source substantives from the textual data. In various embodiments, the target substantive(s) are determined without needing to find a direct match between the words of the textual data and the contents of a set of training data. Textual data analysis server 106 is configured to generate an answer to the textual data by replacing each placeholder target substantive in the analogical answer template with a determined target substantive. The answer may be sent back to client device 102. Client device 102 may display the answer at a display and/or convert the answer into speech data and then play it back using a speaker.

Figure 2:
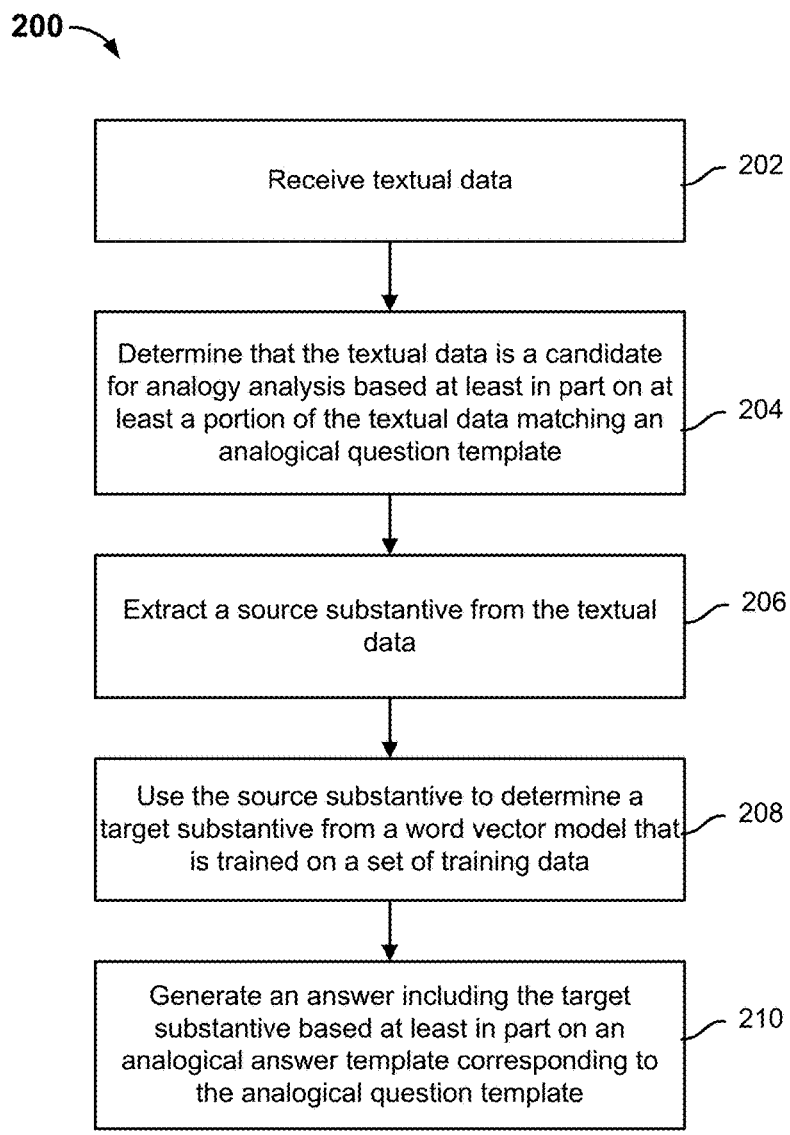
FIG. 2 is a flow diagram showing an embodiment of a process for analyzing textual data.

FIG. 2 is a flow diagram showing an embodiment of a process for analyzing textual data. In some embodiments, process 200 is implemented at a system such as system 100 of FIG. 1.

In various embodiments, process 200 may be implemented by an automated chat service that receives input textual data (e.g., a question) and responds with (e.g., as either presented text and/or output audio) an answer corresponding to the input textual data. For example, process 200 may be implemented by an automated chat service and/or an automated voice assistant service.

At 202, textual data is received.

In various embodiments, the textual data is received via an input interface of a device. For example, the textual data may be received via a touchscreen or keypad of a device. In another example, speech data was first received via a microphone of a device and then converted into textual data by an ASR program executing at the device. In various embodiments, the textual data comprises a question or other type of statement.

At 204, it is determined that the textual data is a candidate for analogy analysis based at least in part on at least a portion of the textual data matching an analogical question template.

In various embodiments, an "analogy" is the comparing of two different (e.g., different classes of) objects (e.g., words) and, on the basis of similarities of one or more attributes of the two (e.g., two classes of) objects and of at least one other attribute that one of the objects is additionally known to have, reaching the conclusion that the other object also has other similar attributes.

Figure 3:
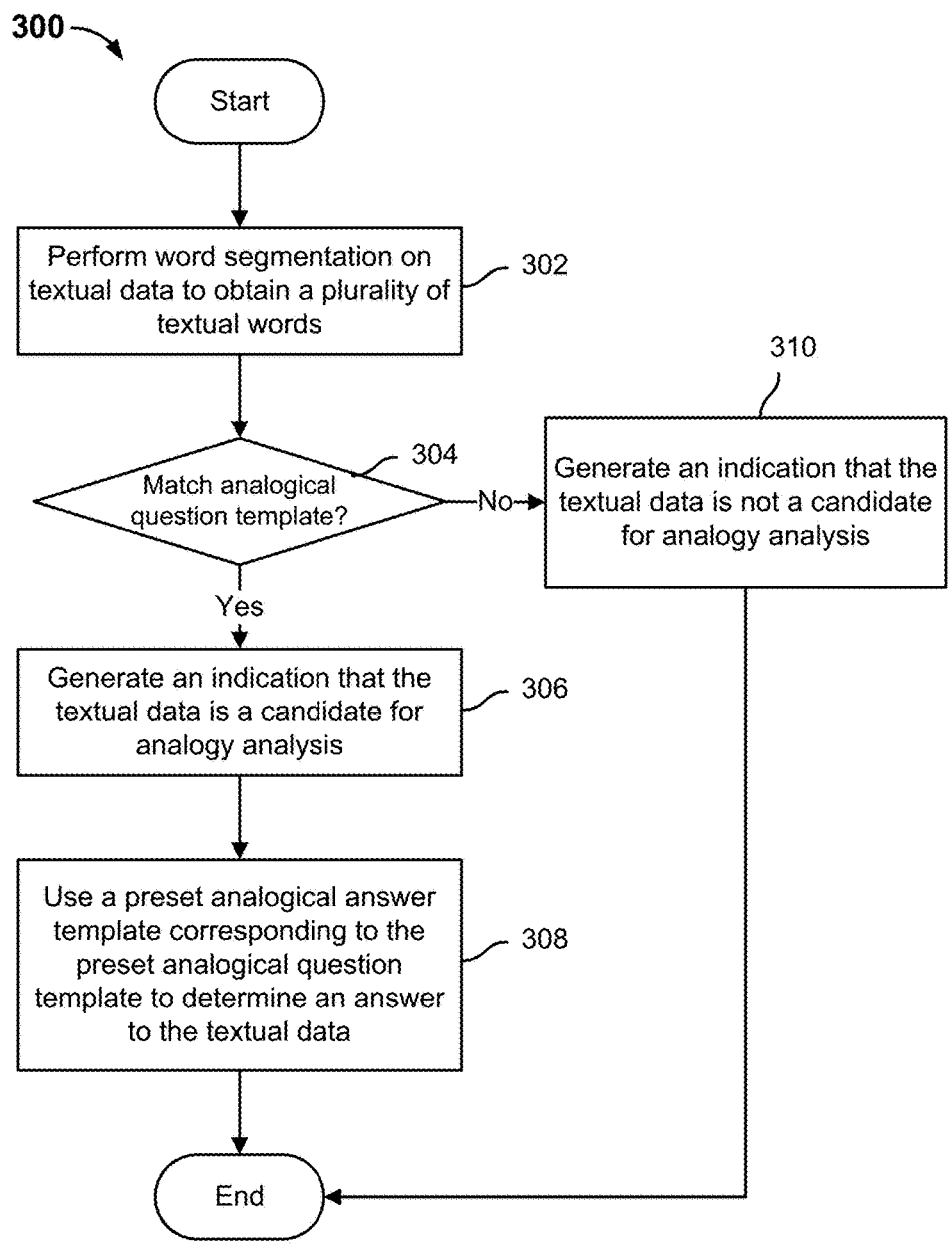
FIG. 3 is a flow diagram showing an embodiment of determining whether received textual data is a candidate for analogy analysis.

It is determined whether the received textual data is a candidate for analogy analysis. In various embodiments, the received textual data is a candidate for analogy analysis if it is determined that the textual data likely has an analogy. In some embodiments, determining whether the received textual data is a candidate for analogy analysis comprises comparing at least a portion of the textual data to one or more analogical question templates and if a matching analogical question template is found, then the textual data is determined to be a candidate for analogy analysis. FIG. 3 describes an example process of determining whether the received textual data is a candidate for analogy analysis.

Returning to FIG. 2, in some embodiments, the received textual data that is determined to be a candidate for analogy analysis may be a question, such as "Who is desk lamp's good friend?" or "What is the relationship between Andy Lau and Jackie Chan?" The answer may therefore be given using an analogy.

At 206, a source substantive is extracted from the textual data.

As used herein, a "substantive" refers to a noun. For example, a substantive may be the name of an individual. In various embodiments, a "source substantive" refers to one or more substantives that are extracted from the received textual data. In various embodiments, a "target substantive" refers to one or more substantives that are determined from a set of training data based on the source substantives of the received textual data.

For example, within the movie star category, a substantive may be "Andy Lau," "Cecilia Cheung," and "Brigitte Lin." Also for example, substantives may also include some individuals of a broad representative category such as persons, movie stars, singers, etc. In some embodiments, the category of a substantive is determined based on a name entity recognizer technique.

For example, in the received textual data of "Who is desk lamp's good friend?", the single source substantive is "desk lamp."

In another example, in the received textual data of "What is the relationship between Andy Lau and Jackie Chan?", the source substantives are "Andy Lau" and "Jackie Chan."

At 208, the source substantive is used to determine a target substantive from a word vector model that is trained on a set of training data.

In various embodiments, one or more attributes of the source substantive(s) are used to select target substantives that are associated with similar attributes from a set of training data.

In some embodiments, a technique that models the relatedness of words is applied to a set of training data. For example, word2vec (word to vector) modeling is used to produce a vector space from a large corpus of text (e.g., training data that is obtained from crawling webpages). Each unique word in the corpus is assigned a corresponding vector in the space and two words that share common attributes in the training data have corresponding word vectors that are located in close proximity to one another in the vector space. It is possible to use word2vec modeling to convert the training data into n-dimensional word vectors, for example, where the value of n is configurable. For example, n=200. These words (including substantives) may be stored in a hash table, in some embodiments. For example, in the hash table, a key may comprise a substantive and a corresponding value may comprise the word vector that was determined from the word2vec modeling for that substantive. As will be described below, the word vectors, generated by the (e.g., word2vec) modeling, corresponding to various words and substantives of the training data are to be used to determine which substantives are similar to each other.

In various embodiments, source substantive(s) that are extracted from the textual data may be converted into corresponding word vectors (e.g., using a technique such as word2vec) in vector space. The word vectors of the source substantives may then be used to identify semantically similar substantives, which may be selected as target substantives to include in an answer to be provided in response to the textual data. Using word vectors to represent source substantive(s) enables the determination of target substantives that may be represented by respective word vectors that are close in proximity to the word vectors of the source substantives in the vector space.

For example, the set of training data may include words that are aggregated from headlines and contents of articles (e.g., after the headlines and articles have been preprocessed) that appear in web pages that have been crawled by spiders.

In some embodiments, the set of training data may include at least the following two types of aggregated data:

1. Static web page data

Web pages that are not often updated (e.g., encyclopedic web pages) may be considered as (relatively) static data. Such web pages may be crawled and their text is added to the set of training data.

2. Dynamic web page data

Web pages that are often updated (e.g., news) may be considered dynamic data. For example, web pages with news that is published within a sliding recent window of time (e.g., the window may be the last six months and the window is updated daily) and their text (e.g., article headlines and article body/content) are crawled and added to the set of training data.

News web page data captures the world's dynamic, changing relationships between various individuals, such as friendships and husband-and-wife relationships.

Figure 4:
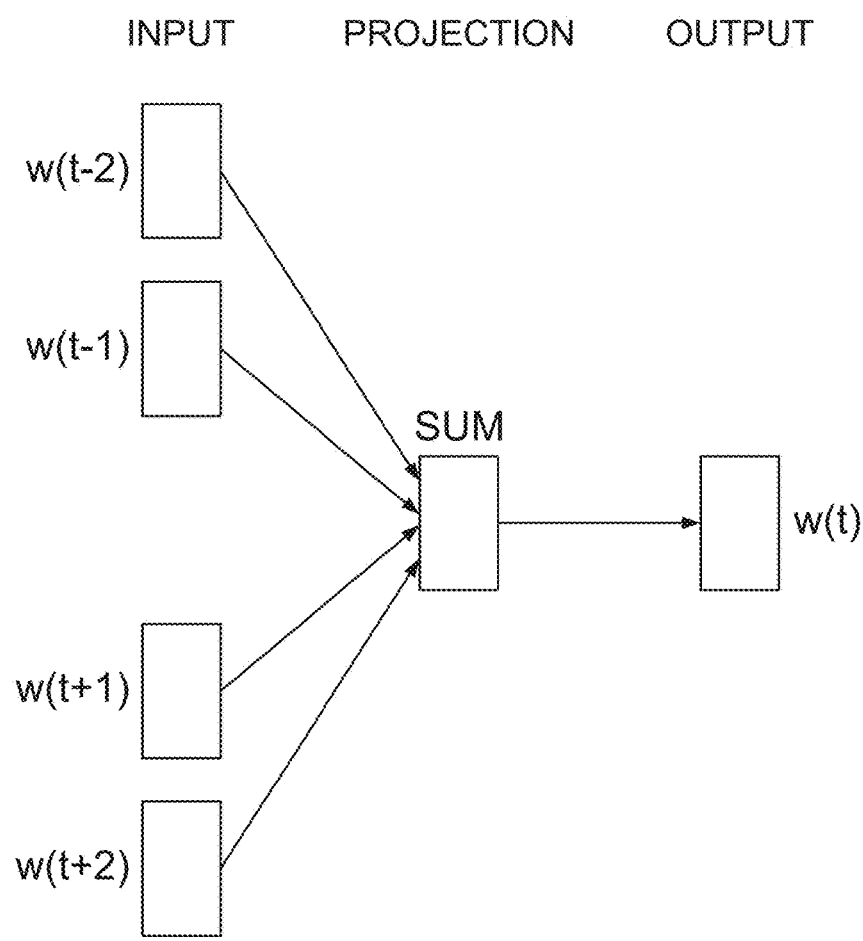
FIG. 4 shows an example diagram of a Continuous Bag-of-Words Model.

Word2vec may use CBOW (Continuous Bag-of-Words Model) to generate a distributed representation of words. As shown in FIG. 4, the CBOW consists of an input layer, a mapping layer (projection), and an output layer (output). For example, CBOW may use w(t)'s first (n=4) words and last (n=4) words to predict the current vector expression for w(t). This approach can shorten the distances expressed by vectors of words that are semantically the same or modally the same.

Figure 7:
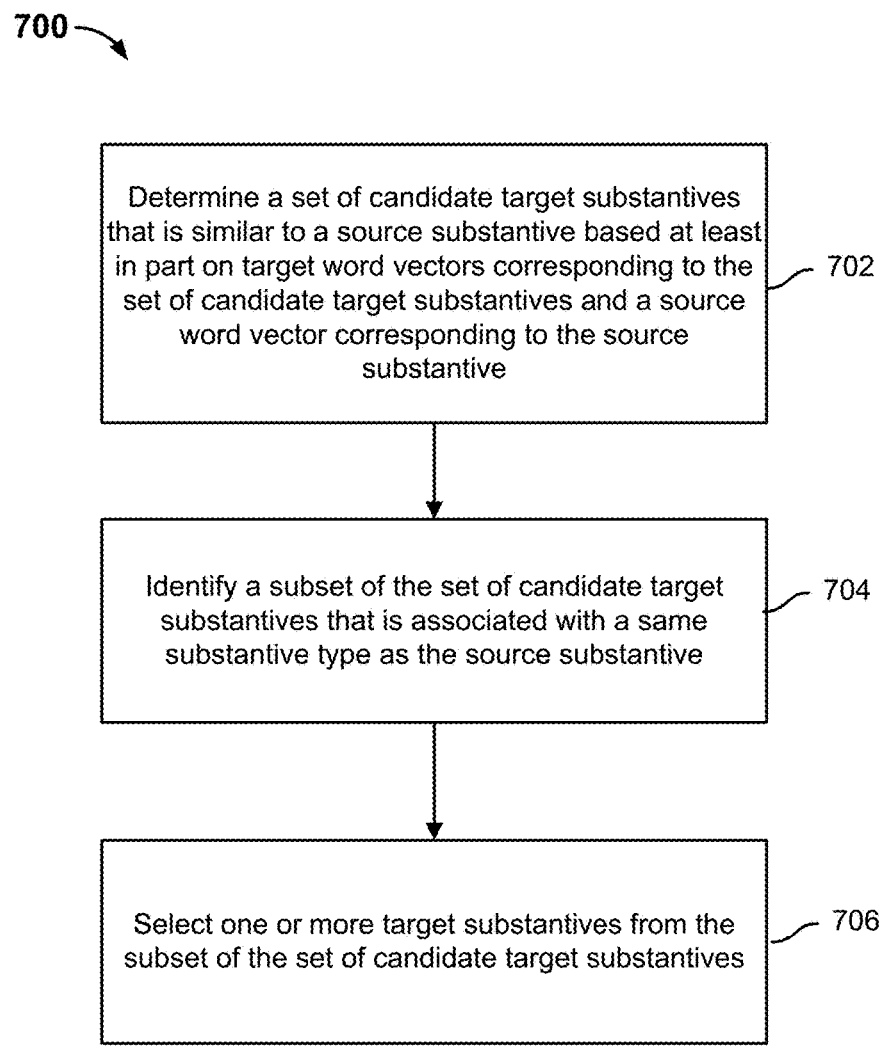
FIG. 7 is a flow diagram showing an example of a process of determining a target substantive corresponding to one source substantive that is extracted from received textual data.

FIG. 7, below, describes an example process of obtaining a target substantive corresponding to one source substantive.

Figure 8:
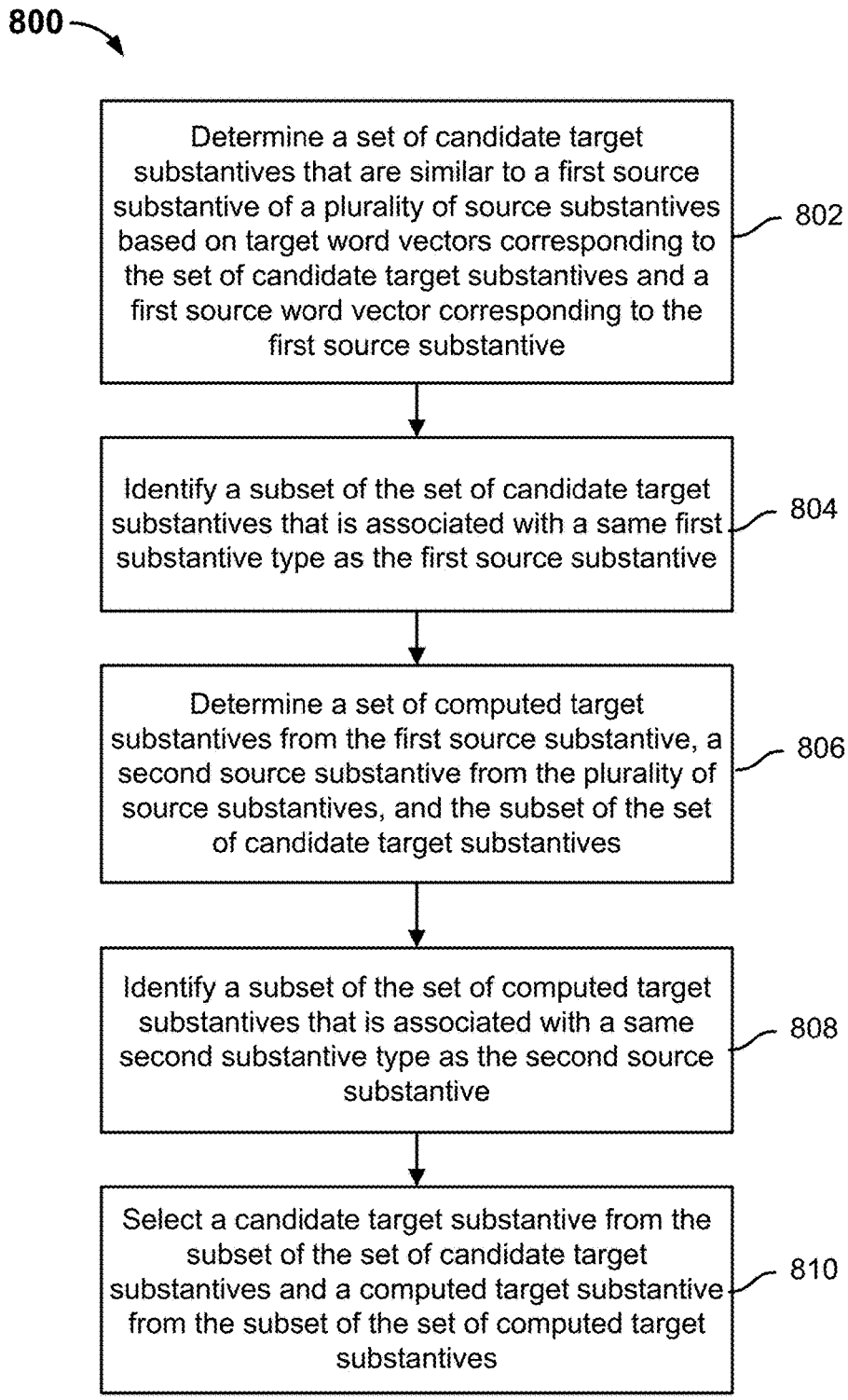
FIG. 8 is a flow diagram showing an example of a process of determining a plurality of target substantives corresponding to a plurality of source substantives that is extracted from received textual data.

FIG. 8, below, describes an example process of obtaining a plurality of target substantives corresponding to a plurality of source substantives.

Returning to FIG. 2, at 210, an answer including the target substantive is generated based at least in part on an analogical answer template corresponding to the analogical question template.

In various embodiments, each analogical question template corresponds to a stored analogical answer template. In some embodiments, the analogical answer template is associated with the same relationship type (among the one or more substantives) as the analogical question template. In some embodiments, an analogical answer template comprises one or more placeholder target substantives in addition to one or more other words. In some embodiments, an analogical answer template comprises one or more placeholder source substantives in addition to the one or more placeholder target substantives.

In some embodiments, due to the large volume of analogical answer templates, the analogical answer templates can be stored using an approach similar to key-value pairs, such as key-set<value> pairs, for example, where the key is the relationship type, i.e., an analogical question template, such as a personal relationship or a static object relationship, and set<value> is a set of analogical answer templates.

When a given key including an analogical question template of a certain relationship type receives a hit in a search of a key-set<value> type of storage, an analogical answer template is selected from among the corresponding set<values> that correspond to that relationship type in the given key. Which analogical answer template corresponding to the given analogical question template of a certain relationship type may be selected at random and/or based on another selection technique. In some embodiments, providing different answer templates is not only based on relationship types.

In various embodiments, a determined target substantive is embedded into the analogical answer template to generate an answer to the received textual data. In some embodiments, embedding a determined target substantive into the analogical answer template comprises to replace a placeholder target substantive in the analogical answer template with a determined target substantive. In some embodiments, the source substantive(s) extracted from the textual data are also embedded in the analogical answer template by replacing one or more placeholder source substantives, if any, in the analogical answer template.

Figure 5:
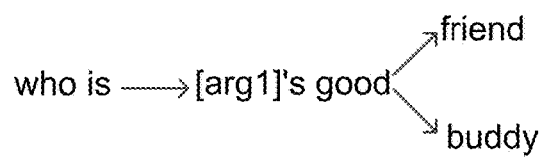
FIG. 5 shows a first example analogical question template associated with a static object relationship.

For example, in the case of the analogical question template shown in FIG. 5 ("who is <arg1>'s good friend/buddy"), it is possible to apply the following analogical answer templates (e.g., the analogical answer templates are stored in a value corresponding to the key that stores the analogical question template of "who is <arg1>'s good friend/buddy"):

1. A's good friend is probably B.
2. I feel that A's good friend is B.
3. A's good friend is someone like B.
4. A and B ought to be able to become friends.

Where A is a placeholder for a first appearing target substantive and B is a placeholder for a second appearing target substantive.

In response to the textual data that includes "Who is desk lamp's good friend?" and the determined target substantives include "wall sticker," "LED lamp," and "television cabinet" and if the third analogical answer template, above, is applied, the answers could be "Desk lamp's good friend is someone like wall sticker," "Desk lamp's good friend is someone like LED lamp," or "Desk lamp's good friend is someone like television cabinet."

Figure 6:
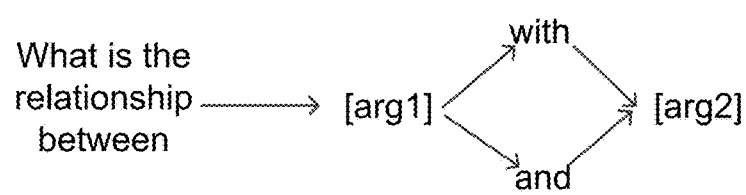
FIG. 6 shows a second example analogical question template associated with a personal relationship.

To give another example, in the case of the analogical question template shown in FIG. 6 ("what is the relationship between <arg1> with/and <arg2>"), it is possible to apply the following analogical answer templates (e.g., the analogical answer templates are stored in a value corresponding to the key that stores the analogical question template of "what is the relationship between <arg1> with/and <arg2>"):

1. Their relationship is complicated. It is about the same as the relationship of C with D.
2. Just like C and D, if you know what I mean.
3. Actually, their relationship is the same as C and D.
4. Well, I feel that it's very much like C and D's relationship.
5. If I compared them to C and D, don't you feel that that would be very appropriate?
6. A and B's relationship is just like C and D's relationship.
7. A and B are similar to C and D.
8. A and B are just like C and D.
9. A and B's relationship seems a lot like C and D's relationship.
10. A and B's relationship makes me think of C and D's relationship.

Where A is a placeholder for the source substantive that appears first in the textual data, B is a placeholder for the source substantive that appears second in the textual data, C is a placeholder for the target substantive that appears first in the answer in response to the textual data, and D is a placeholder for the target substantive that appears second in the answer in response to the textual data.

In response to the textual data that includes "What is the relationship between Andy Lau and Jackie Chan?", and if the determined target substantives were Leehom Wang and Jay Chou and the sixth analogical answer template, above, is applied, the answer could be "Andy Lau and Jackie Chan's relationship is just like Leehom Wang and Jay Chou's relationship."

In some embodiments, in the event that the textual data was sent by the client, then the generated answer could be sent directly back to the client and then displayed at the client.

In some embodiments, in the event that the received textual data was derived from speech data, then the generated answer could be first converted into second speech data, and the second speech data could be sent back and played back at the client. In some embodiments, in the event that the received textual data was derived from speech data, then the generated answer could be directly sent back to the client and then displayed at the client. In some embodiments, in the event that the received textual data was derived from speech data, then the generated answer could be directly sent back to the client and then displayed at the client and also played back as speech data.

As described above, in various embodiments, it is first determined whether the textual data has analogical intent, then the source substantive(s) of the textual data are compared against training data to determine one or more target substantives. An answer to the textual data is then generated from the determined one or more target substantives. In various embodiments, word vectors are constructed from a large volume of unmarked text and analogical answers are implemented without having to construct a large knowledge base, thus reducing the amount of effort and resources that are consumed, as well as lowering costs. Without needing to directly identify the exact relationship between source substantives and target substantives, various embodiments describe responding to textual data by using an analogical approach, which increases coverage rates and also raises the response success rate for analogical questions.

FIG. 3 is a flow diagram showing an embodiment of determining whether received textual data is a candidate for analogy analysis. In some embodiments, step 204 of process 200 of FIG. 2 may be implemented using process 300.

At 302, word segmentation is performed on textual data to obtain a plurality of textual words.

In some embodiments, word segmentation may be performed in one or more of the following ways:

1. Character string matching-based word segmentation: This refers to matching a to-be-analyzed character string against entries in a preset machine dictionary according to a certain strategy. If a certain character string is found in the dictionary, then the match is successful (i.e., a word is recognized).

2. Word segmentation based on feature scanning or sign segmentation: This refers to the priority recognition and excision of some words having obvious features from among to-be-analyzed character strings. An example of a word with an obvious feature is a numbered bullet point and content before and after the bullet point can be split up at the bullet point. With these words serving as break points, it is possible to split the original character strings into smaller strings and then to subject them to mechanical word segmentation, thereby reducing the match error rate. Or word segmentation is combined with part-of-speech tagging, and abundant part-of-speech information is used to help word segmentation decision-making. Moreover, in the tagging process, the word segmentation results conversely undergo testing and adjustment, with improved splitting precision as a result.

3. Comprehension-based word segmentation: This refers to the attaining of word recognition results through sentence comprehension by a computer program (e.g., that simulates human recognition). The basic concept involves conducting syntactic and semantic analysis simultaneously with word segmentation and using syntactic information and semantic information to handle ambiguous phenomena. It generally comprises three parts: A word segmentation subsystem, a syntactic-semantic subsystem, and a general control part. Coordinated by the general control part, the word segmentation subsystem can obtain syntactic and semantic information for the relevant words and sentences in order to assess word segmentation ambiguities. That is, it simulates the process whereby a person comprehends a sentence.

4. Statistics-based word segmentation: This refers to the fact that the frequency or probability of co-occurrence for neighboring characters in character-based language such as Chinese (or neighboring words in word-based language such as English) can better reflect the confidence level for a word. Therefore, it is possible to total the frequencies of various co-occurring character combinations (or word combinations) within a corpus, to calculate their mutual information and to calculate the co-occurrence probability for two characters or words X and Y. Mutual information can embody the tightness of the combining relationship between characters or words. When the tightness is higher than a certain threshold value, this character or word combination may be regarded as constituting a word or phrase.

The approaches to word segmentation described above are only examples. In actual practice, other techniques of word segmentation may be used.

At 304, it is determined whether one or more textual words of the plurality of textual words match a preset analogical question template. In the event that it is determined that the one or more textual words of the plurality of textual words match a preset analogical question template, control is transferred to 306. Otherwise, in the event that it is determined that the one or more textual words of the plurality of textual words do not match a preset analogical question template, control is transferred to 310.

The one or more textual words that were segmented from the textual data are compared against each of a set of preset analogical question templates. In some embodiments, the segmented textual words of the textual data comprise substantives (e.g., nouns) and other types of words. Each preset analogical question template corresponds to a stored preset analogical answer template that is to be used to provide an answer to the matching textual data. As such, corresponding relationships between analogical question templates and analogical answer templates are established in advance for various relationship types (e.g., frames in the analogical approach).

In various embodiments, an "analogical question template" includes a basic structure that is suited to textual analogical questions. In some embodiments, an analogical question template comprises one or more placeholder source substantives, in addition to one or more other words. In some embodiments, the textual words segmented from textual data match a preset analogical question template in the event that the locations of the source substantive(s) of the segmented textual words match the locations of the placeholder source substantives in the preset analogical question template and that at least some of the other textual words match the locations of corresponding words in the preset analogical question template.

In various embodiments, an analogical answer template has a basic structure for answering questions and retaining the positions of target substantives. In some embodiments, an analogical answer template comprises one or more placeholder target substantives, in addition to one or more other words.

In various embodiments, preset analogical question templates and analogical answer templates are stored permanently in text using self-defined structures. In some embodiments, preset analogical question templates and analogical answer templates are loaded into memory during matching.

In some embodiments, a context-free grammar (CFG) parser is used to carry out matching of analogical question templates to textual words that have been segmented from the received textual data. Other appropriate grammar parsers can also be used.

In a CFG parser, formal grammar is defined by G=(N, $\Sigma$, P, S), where:

N is a finite set; each element is called a nonterminal character or a variable. Each variable represents a different type of phrase or clause in the sentence. Variables are also sometimes called syntactic categories. Each variable defines a sub-language of the language defined by G.

$\Sigma$ is a finite set of terminals, disjoint from N, which make up the actual content of the sentence. The set of terminals is the alphabet of the language defined by the grammar G.

P is a finite relation from N to $(N \cup \Sigma)^*$, where the asterisk represents the Kleene star operation. The members of P are called the (rewrite) rules or productions of the grammar.

S is the start variable (or start symbol), used to represent the whole sentence (or program). It must be an element of N.

The production rule for the formal grammar always takes the following form: V→w (which indicates that V is to be replaced with w), then it is called context-free, wherein V∈N and w∈$(N \cup \Sigma)^*$.

The reason that context-free grammar is called "context-free" is that the character V can always be freely substituted by the string w without having to consider the context in which the character V occurs.

A formal language is context-free if it is produced from context-free grammar (grammar unrelated to an entry's context).

If, following word segmentation, at least some of the textual words match a preset analogical question template, then the textual data is determined to be suitable for analogy.

FIG. 5 shows a first example analogical question template associated with a static object relationship. It should be noted that a static object relationship is only one example of a relationship type and that analogical question templates may be established for other relationship types as well. In the analogical question template of FIG. 5, "arg1" is a placeholder for a source substantive and the question structure is shown to have "who is" followed by "arg1" followed by either the words/phrases "friend" or "buddy."

Returning to FIG. 3, given the textual data of "Who is desk lamp's good friend?", the textual words that are segmented from that data include the source substantive "desk lamp" and other words/phrases such as "good friend" and "who is." Because the location of the source substantive "desk lamp" matches the location of "arg1" in the analogical question template and the location of the remaining words of the textual data matches the location of the other words of the analogical question template, it is determined that the textual data is a candidate for analogy analysis.

FIG. 6 shows a second example analogical question template associated with a personal relationship. It should be noted that a personal relationship is only one example of a relationship type and that analogical question templates may be established for other relationship types as well. In the analogical question templates of FIGS. 5 and 6, "arg1" and "arg2" are placeholders for two source substantives and the question structure is shown to have "what is the relationship between," followed by "arg1," followed by either "with" or "and," and followed by "arg2."

Given the textual data of "What is the relationship of Andy Lau with Jackie Chan?", the textual words that are segmented from that data include the source substantives "Andy Lau" and "Jackie Chan," as well as the other words "of" "the," "with," "is," "what," and "relationship." Because the location of the source substantive "Andy Lau" matches the location of "arg1," the location of the source substantive "Jackie Chan" matches the location of "arg2" in the analogical question template, and the locations of the remaining words of the textual data match the locations of the other words of the analogical question template, it is determined that the textual data is a candidate for analogy analysis.

Returning to FIG. 3, at 306, an indication that the textual data is a candidate for analogy analysis is generated.

At 308, a preset analogical answer template corresponding to the preset analogical question template is used to determine an answer to the textual data.

As mentioned above, each preset analogical question template corresponds to a preset analogical answer template. In some embodiments, the preset analogical answer template comprises one or more source substantive placeholders. In some embodiments, the preset analogical answer template has as many target substantive placeholders as there are source substantive placeholders in the preset analogical question template corresponding to the preset analogical answer template. In various embodiments, the one or more substantive placeholders of the preset analogical answer template are to be replaced with selected target substantives that are determined based on the one or more substantives of the textual data. The preset analogical answer template that has been modified to include the selected target substantives (in place of the placeholder target substantives) is then presented at a user interface (e.g., at a display and/or converted into speech and then played back at a speaker).

At 310, an indication that the textual data is not a candidate for analogy analysis is generated.

FIG. 7 is a flow diagram showing an example of a process of determining a target substantive corresponding to one source substantive that is extracted from received textual data. In some embodiments, step 208 of process 200 of FIG. 2 is implemented at least in part by process 700.

In the example of process 700, only one source substantive is identified from the received textual data. In various embodiments, in the event that only one source substantive is identified from the received textual data, the analogical answer template corresponding to the matching analogical question template may include one or more placeholder target substantives. As such, process 700 describes a process of selecting the one or more target substantives to replace the one or more placeholder target substantives of the analogical answer template corresponding to the matching analogical question template, based on the source substantive. The modified analogical answer template is to be provided as an answer in response to the textual data.

At 702, a set of candidate target substantives that is similar to a source substantive are determined based at least in part on target word vectors corresponding to the set of candidate target substantives and based at least in part on a source word vector corresponding to the source substantive.

A source word vector corresponding to the source substantive that is extracted from the received textual data is determined (e.g., using a modeling tool that models the linguistic contexts of words such as the word2vec model) and one or more target word vectors of one or more candidate target substantives are determined (e.g., using a modeling tool that models the linguistic contexts of words such as the word2vec model). A "source word vector" refers to a word vector that describes a source substantive in the vector space. A "target word vector" refers to a word vector that describes a target substantive in the same vector space. In various embodiments, a "candidate target substantive" is a candidate of the one or more target substantives that are to be included in an answer to be presented in response to the textual data.

A similarity level is determined between a source word vector corresponding to a source substantive and the target word vector corresponding to each of one or more candidate target substantives. In some embodiments, a similarity level between a source word vector and a target word vector is measured using a cosine distance between the two word vectors. The greater the similarity level is between the word vectors corresponding to a source substantive and a candidate target substantive (e.g., the higher the cosine distance), the more similar the source substantive is to the candidate target substantive.

For example, the word "france" is the source substantive. A determination of the cosine distances between "france" and each of a set of candidate target substantives (e.g., a set of country/region names) will identify the candidate target substantives that are the closest in the vector space and are therefore more similar to "france." Examples of the most similar candidate target substantives are the following:

TABLE 1

| Candidate target substantives | Cosine distance |
| --- | --- |
| spain | 0.678515 |
| belgium | 0.665923 |
| netherlands | 0.652428 |
| italy | 0.633130 |

TABLE 1-continued

| Candidate target substantives | Cosine distance |
| --- | --- |
| switzerland | 0.622323 |
| luxembourg | 0.610033 |
| portugal | 0.577154 |
| russia | 0.571507 |
| germany | 0.563291 |
| catalonia | 0.534176 |
| hamburg | 0.1253 |

At 704, a subset of the set of candidate target substantives that is associated with the same substantive type as the source substantive is identified.

In various embodiments, when an analogical answer is given to a question that is in the textual data, generally, the type of substantive in the question remains consistent with the type of substantive in the answer. As such, the subset of the set of candidate target substantives that are of the same substantive type as the source substantive is retained and from which the target substantive is to be selected. The candidate target substantives that are not of the same substantive type as the source substantive are ignored as not being suitable to be selected for including in the answer to the textual data.

In various embodiments, a type of a substantive may include a category of the substantive, a part of speech of the substantive, and/or any other appropriate attribute of the substantive.

For example, for the substantive of "desk lamp," other substantives having the same substantive type include "wall stickers," "LED lamp," and "television cabinet" (which are all in the same category of home furnishing as desk lamp).

For example, for the substantive of "france," the subset of the other substantives from Table 1, above, that have the same substantive type of country/region name as "france" include "spain," "belgium," "netherlands," "italy," "switzerland," "luxembourg," "portugal," "russia," "germany," and "catalonia." "Hamburg," which is associated with the substantive type of "city," therefore, does not share the same substantive type of country/region name as "france."

At 706, one or more target substantives are selected from the subset of the set of candidate target substantives.

Each target substantive is selected from the subset of the set of candidate target substantives. In some embodiments, the candidate target substantive(s) associated with the highest similarity levels or having similarity levels exceeding a threshold with the source substantive are selected. In some embodiments, as many candidate target substantives as there are placeholder target substantives in the analogical answer template corresponding to the matching analogical question template are selected from the subset of the set of candidate target substantives. In various embodiments, each selected candidate target substantive is used to replace a placeholder target substantive in the analogical answer template.

For example, for the substantive of "france," the other substantives from Table 1, above, that have similarity levels that are over the example similarity level threshold of 0.65 include "spain," "belgium," and "netherlands."

FIG. 8 is a flow diagram showing an example of a process of determining a plurality of target substantives corresponding to a plurality of source substantives that is extracted from received textual data. In some embodiments, step 208 of process 200 of FIG. 2 is implemented at least in part by process 800.

In the example of process 800, multiple source substantives are identified from the received textual data. In various embodiments, in the event that multiple source substantives are identified from the received textual data, the analogical answer template corresponding to the matching analogical question template also includes multiple placeholder target substantives. As such, process 800 describes a process of selecting the target substantives to replace the multiple placeholder target substantives of the analogical answer template corresponding to the matching analogical question template, based on the source substantives. The modified analogical answer template is to be provided as an answer in response to the textual data.

At 802, a set of candidate target substantives that is similar to a first source substantive of a plurality of source substantives is determined based on target word vectors corresponding to the set of candidate target substantives and a first source word vector corresponding to the first source substantive.

In the event that the textual data comprises at least a first source substantive and a second source substantive, one or more candidate target substantives that are similar to the first source substantive are determined. In some embodiments, the first source substantive is the source substantive that first appears in the textual data.

For example, the textual data comprises the question of "What is the relationship between Andy Lau with Jackie Chan?" In this example, the first source substantive is "Andy Lau," and the second source substantive is "Jackie Chan" because "Andy Lau" appears before "Jackie Chan" in the question.

A first source word vector corresponding to the first source substantive that is extracted from the received textual data is determined (e.g., using a modeling tool to model the linguistic contexts of words such as the word2vec model) and one or more target word vectors of one or more candidate target substantives are determined (e.g., using a modeling tool to model the linguistic contexts of words such as the word2vec model).

A similarity level is determined between a first source word vector corresponding to a first source substantive and the target word vector corresponding to each of one or more candidate target substantives. In some embodiments, a similarity level between a first source word vector and a target word vector comprises a cosine distance between the two word vectors. The greater the similarity level is between the word vectors corresponding to a first source substantive and a candidate target substantive, the more similar the first source substantive is to the candidate target substantive.

In some embodiments, those candidate target substantives whose similarity levels with the first source substantive are below a threshold similarity level are filtered out (e.g., ignored in subsequent processing).

For example, for the example textual data that includes "What is the relationship between Andy Lau with Jackie Chan?", it is possible to calculate n (n is an integer) candidate target substantives that are most similar to the first source substantive. For the first source substantive of "Andy Lau," the n=5 candidate target substantives that are most similar to that first source substantive are "Felix Wong," "Michael Miu," "Leehom Wang," "Lost and Love" and "Icy Rain." From these five candidate target substantives, the candidate target substantives that are most similar to "Andy Lau" (e.g., the candidate target substantives whose similarity levels with "Andy Lau" exceed a threshold similarity level) are "Michael Miu," "Felix Wong," "Leehom Wang" and "Icy Rain." The other candidate target substantive of "Lost and Love," however, is filtered out (e.g., because its similarity level with "Andy Lau" did not exceed the threshold similarity level).

At 804, a subset of the set of candidate target substantives that is associated with a same first substantive type as the first source substantive is identified.

In various embodiments, when an analogical answer is given to a question that is in the textual data, generally, the types of substantives in the question remain consistent with the types of substantives in the answer. As such, the subset of the set of candidate target substantives that are of the same substantive type as the first source substantive is retained and from which one or more target substantives are to be selected. The candidate target substantives that are not of the same substantive type as the first source substantive are ignored as not being suitable to be selected for including in the answer to the textual data.

For example, the substantive type of the first source substantive "Andy Lau" is Movie Stars. Therefore, the candidate target substantive "Icy Rain," which has the substantive type Songs, is filtered out from the set of candidate target substantives including "Michael Miu," "Felix Wong," "Leehom Wang," and "Icy Rain." As such, "Michael Miu," "Felix Wong," and "Leehom Wang," which have the substantive type of Movie Stars, are retained for further processing.

At 806, a set of computed target substantives is determined from the first source substantive, a second source substantive from the plurality of source substantives, and the subset of the set of candidate target substantives.

In various embodiments, a computed word vector is determined based on the first source word vector corresponding to the first source substantive, a second source word vector corresponding to the second source substantive, and the target word vector of each candidate target substantive.

In some embodiments, a computed word vector may be calculated using the formula of $D=A-B+C$, wherein A is the word vector of the first source substantive, B is the word vector of the second source substantive, C is the word vector of a candidate target substantive, and D is the word vector of the computed word vector. Put another way, the computed word vector is determined by subtracting the second source word vector from the first source word vector and adding the difference to the target word vector corresponding to a candidate target substantive.

In various embodiments, the computed word vector that is determined based on the first source word vector corresponding to the first source substantive, a second source word vector corresponding to the second source substantive, and the target word vector of each candidate target substantive is used to identify a related target substantive. The target substantive (from a set of training data) whose word vector is the closest to the computed word vector that is determined based at least in part on the target word vector of a particular candidate target substantive is determined to be the computed target substantive relative to that particular candidate target substantive. It is therefore possible that the word vector corresponding to a computed target substantive is not exactly the same as the computer word vector.

For example, if the first source substantive is "Andy Lau," the second source substantive is "Jackie Chan," and the candidate target substantives are "Michael Miu," "Felix Wong" and "Leehom Wang."

To determine the related target substantive associated with the candidate target substantive of "Michael Miu," the source word vector for "Jackie Chan" is subtracted from the source word vector for "Andy Lau" and that difference is added to the target word vector for "Michael Miu" to obtain a computed word vector. If the word vector for the target substantive "Wireless" is closest to the computed word vector, then "Wireless" can be determined as the computed target substantive relative to the candidate target substantive of "Michael Miu."

To determine the related target substantive associated with the candidate target substantive of "Felix Wong," the source word vector for "Jackie Chan" is subtracted from the source word vector for "Andy Lau" and that difference is added to the target word vector for "Felix Wong" to obtain a computed word vector. If the word vector for the target substantive "Tony Leung" is closest to the computed word vector, then "Tony Leung" can be determined as the computed target substantive relative to the candidate target substantive of "Felix Wong."

To determine the related target substantive associated with the candidate target substantive of "Leehom Wang," the source word vector for "Jackie Chan" is subtracted from the source word vector for "Andy Lau" and that difference is added to the target word vector for "Leehom Wang" to obtain a computed word vector. If the word vector for the target substantive "Jay Chou" is closest to the computed word vector, then "Jay Chou" can be determined as the computed target substantive relative to the candidate target substantive of "Leehom Wang."

At 808, a subset of the set of computed target substantives that is associated with a same second substantive type as the second source substantive is identified.

The subset of the set of computed target substantives that is of the same substantive type as the second source substantive is retained and from which a target substantive is to be selected. The computed target substantives that are not of the same substantive type as the second source substantive are ignored as not being suitable to be selected to be included in the answer to the textual data.

For example, the substantive type of the second source substantive "Jackie Chan" is Movie Stars. Therefore, the computed target substantive "Wireless," whose substantive type is Companies, is filtered out from the set of computed target substantives including "Wireless," "Tony Leung" and "Jay Chou." As such, "Tony Leung" and "Jay Chou," which have the substantive type of Movie Stars are retained for further processing.

It should be noted that because each computed target substantive is derived from a corresponding candidate target substantive, the computed target substantive and the candidate target substantive are related. Therefore, when a computed target substantive is filtered out, due to the computed target substantive having a substantive type that is different from the substantive type of the second source substantive, its corresponding candidate target substantive is also filtered out. Likewise, when a computed target substantive is retained for further processing, due to the computed target substantive having the same substantive type as the substantive type of the second source substantive, its corresponding candidate target substantive is also retained for further processing.

For example, because the computed target substantive "Wireless" was filtered out from among the set of computed target substantives, the candidate target substantive of "Michael Miu" that is related to "Wireless" is also filtered out. As a result, only the candidate target substantives "Felix Wong" and "Leehom Wang" are retained for further processing.

At 810, a candidate target substantive is selected from the subset of the set of candidate target substantives and a computed target substantive is selected from the subset of the set of computed target substantives.

In some embodiments, a candidate target substantive and a computed target substantive are selected using the formula below:

$$\text{score}(C, D) = \max_{c_i, d_j} \lambda * \text{distance}(A, c_i) + (1 - \lambda) * \text{distance}(A - B + c_i, d_j) \quad (1)$$

Where A is the word vector of the first source substantive, B is the word vector corresponding to the second source substantive, C is the word vector corresponding to a candidate target substantive, D is the word vector of a computed word vector, $c_i$ is the word vector corresponding to the $i^{th}$ candidate target substantive, $d_j$ is the word vector corresponding to the $j^{th}$ computed target substantive, and $\lambda$ is a constant. In some embodiments, $\lambda$ is set empirically.

The first distance, distance (A, $c_i$), is determined as the distance between the word vector of the first source substantive and the word vector of the candidate target substantive.

The second distance, distance (A−B+$c_i$, $d_j$), is determined as the distance between the computed word vector and the word vector of a computed target substantive. The computed word vector is determined by subtracting the word vector of the second source substantive from the word vector of the first source substantive and then adding that difference to the word vector of a candidate target substantive.

The first distance and the second distance are used by formula (1) to determine scores for a pair of a candidate target substantive and a related computed target substantive.

In various embodiments, the highest-scoring pair of a candidate target substantive and a related computed target substantive is selected to be the target substantives to replace the two placeholder target substantives of the analogical answer template. In some embodiments, the placeholder target substantive that appears first in the analogical answer template is replaced with the candidate target substantive of the highest-scoring pair and the placeholder target substantive that appears second in the analogical answer template is replaced with the computed target substantive of the highest-scoring pair.

For example, assuming that formula (1) was used with the word vectors corresponding to the first source substantive of "Andy Lau," the second source substantive of "Jackie Chan," the candidate target substantive of "Felix Wong," and the computed target substantive of "Tony Leung," the resulting score would be 0.85. Assuming that formula (1) was used with the word vectors corresponding to the first source substantive that is calculated by plugging in "Andy Lau," the second source substantive of "Jackie Chan," the candidate target substantive of "Leehom Wang," and the computed target substantive of "Jay Chou," the resulting score would be 0.93. Since 0.93>0.85, "Leehom Wang" and "Jay Chou" are determined to be the first and second appearing target substantives, respectively. For example, if the analogical answer template were "<source_arg1> and <source_arg2>'s relationship is just like <target_arg1> and <target_arg2>'s relationship," then after the placeholder source substantives <source_arg1> and <source_arg2> are replaced with "Andy Lau" and "Jackie Chan" and placeholder target substantives of <target_arg1> and <target_arg2> are replaced by "Leehom Wang" and "Jay Chou," the resulting answer to the textual data would be "Andy Lau and Jackie Chan's relationship is just like Leehom Wang and Jay Chou's relationship."

Figure 9:
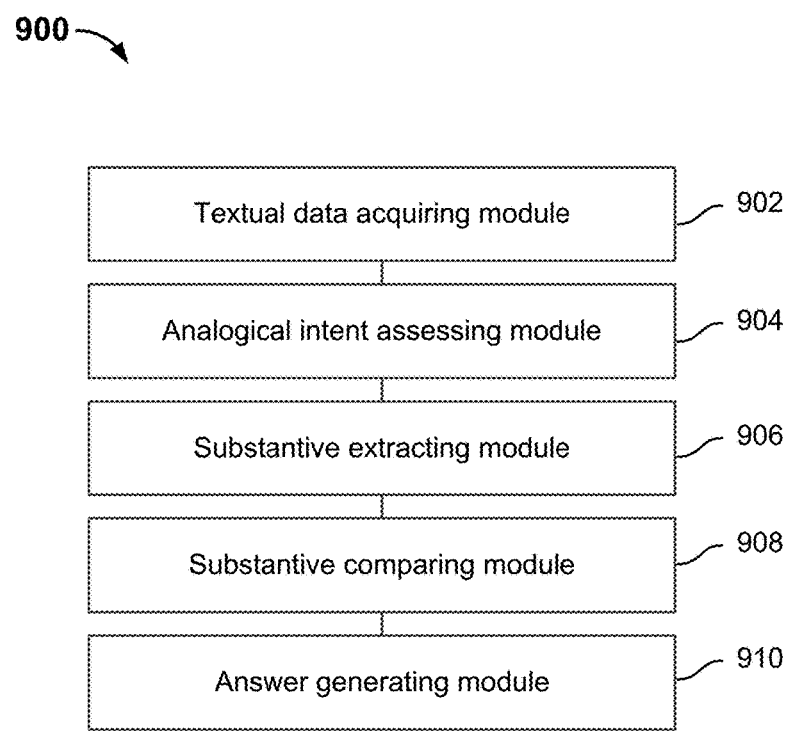
FIG. 9 is a diagram of a system for analyzing textual data.

FIG. 9 is a diagram of a system for analyzing textual data. In the example, system 900 includes textual data acquiring module 902, analogical intent assessing module 904, substantive extracting module 906, substantive comparing module 908, and answer generating module 910.

The modules, sub-modules, and units can be implemented as software components executing on one or more processors, as hardware such as programmable logic devices, and/or Application Specific Integrated Circuits designed elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, sub-modules, and units may be implemented on a single device or distributed across multiple devices.

Textual data acquiring module 902 is configured to receive textual data.

Analogical intent assessing module 904 is configured to determine whether the textual data is a candidate for analogy analysis. In the event that the textual data is a candidate for analogy analysis, analogical intent assessing module 904 is configured to invoke substantive extracting module 906.

Substantive extracting module 906 is configured to extract a source substantive from the textual data.

Substantive comparing module 908 is configured to determine a target substantive based at least in part on the extracted source substantive.

Answer generating module 910 is configured to generate an answer to the textual data based on the target substantive.

In some embodiments, analogical intent assessing module 904 may include the following sub-modules:

A word segmenting sub-module that is configured to perform word segmentation on the textual data to obtain multiple textual words.

An analogical question template matching sub-module that is configured to compare the one or more of the textual words to preset analogical question templates.

An analogical intent determining sub-module that is configured to determine whether the textual data is a candidate for analogy analysis in the event that the textual words match a preset analogical question template.

In some embodiments, substantive comparing module 908 may comprise the following sub-modules:

A first candidate substantive looking-up sub-module that is configured to determine one or more candidate target substantives that are similar to the source substantive, in the event that there is only source substantive.

A second candidate substantive screening sub-module that is configured to identify a subset of the set of candidate target substantives that are associated with a same substantive type as the source substantive.

A first substantive selecting sub-module that is configured to select one or more target substantives from the subset of the set of candidate target substantives.

In some embodiments, the first candidate substantive looking-up sub-module may comprise the following units:

A first source word vector looking-up unit that is configured to look up a first source word vector corresponding to the source substantive and also one or more target word vectors corresponding to candidate target substantives.

A first similarity level calculating unit that is configured to determine similarity levels between the first source word vector and the one or more target word vectors.

A first candidate substantive extracting unit that is configured to extract one or more of the candidate target substantives associated with the highest similarity level and in some embodiments, the candidate target substantive associated with having the highest similarity level with respect to the first source substantive is the most similar to that source substantive.

In some embodiments, substantive extracting module 906 may comprise the following sub-modules:

A third candidate substantive looking-up sub-module that is configured to determine a set of candidate target substantives similar to a first source substantive of the textual data in the event that the textual data comprises multiple source substantives.

A fourth candidate substantive screening sub-module that is configured to determine a subset of the set of candidate target substantives corresponding to the first source substantive that are associated with the same substantive type as the first source substantive.

A fifth candidate substantive calculating sub-module that is configured to determine a set of computed target candidates from the set of candidate target substantives associated with the first source substantive based on the first source substantive, a second source substantive, and the subset of the set of candidate target substantives.

A sixth candidate substantive screening sub-module that is configured to identify a subset of the set of computed target substantives that are associated with a same second substantive type as the second source substantive.

A second substantive selecting sub-module that is configured to select a candidate target substantive from the subset of the set of candidate target substantives and a computed target substantive from the subset of the set of computed target substantives.

In some embodiments, the third candidate substantive looking-up sub-module may comprise the following units:

A second word vector looking-up unit that is configured to determine a first source word vector corresponding to the first source substantive and the target word vectors corresponding to the set of candidate target substantives.

A second similarity level calculating unit that is configured to determine similarity levels between the first source word vector corresponding to the first source substantive and the target word vectors corresponding to the set of candidate target substantives.

A third candidate substantive extracting unit that is configured to extract the candidate target substantives that have the highest similarity levels with the first source substantive as being the candidate target substantives that are the most similar to the first source substantive.

In some embodiments, the fifth candidate substantive calculating sub-module may comprise the following units:

A third word vector looking-up unit that is configured to determine a first source word vector corresponding to the first source substantive, the target word vectors corresponding to the set of candidate target substantives, and a second source word vector corresponding to the second source substantive.

A vector calculating unit that is configured to determine a difference between the first source word vector and the second source word vector and then adding the difference to a target word vector corresponding to a candidate target substantive to obtain a computed word vector.

A fifth candidate substantive determining unit that is configured to determine a word vector corresponding to a substantive that is the closest to the computed word vector. The substantive whose word vector is the closest to the computed word vector is a computed target substantive.

In some embodiments, the second substantive selecting sub-module may comprise the following units:

A first distance calculating unit that is configured to determine a first distance based on the first source word vector corresponding to the first source substantive and a target word vector corresponding to a candidate target substantive.

A second distance calculating unit that is configured to determine a second distance based on the computed word vector and the word vector of a computed target substantive. The computed word vector is determined by subtracting the word vector of the second source substantive from the word vector of the first source substantive and then adding that difference to the word vector of a candidate target substantive.

A score calculating unit that is configured to use the first distance and the second distance to determine a score corresponding to a pair of a candidate target substantive and a computed target substantive.

A selecting unit that is configured to select the highest-scoring fourth pair of a candidate target substantive and a computed target substantive.

In some embodiments, answer generating module 910 may comprise the following sub-modules:

An analogical answer template looking-up sub-module that is configured to determine an analogical answer template belonging to the same relationship type as the matching analogical question template.

An analogical answer template embedding sub-module that is configured to embed the one or more target substantives into the analogical answer template to obtain an answer.

In some embodiments, system 900 may further comprise the following modules:

A text conversion module that is configured to receive speech data sent from a client and then convert the speech data into textual data.

A speech converting module that is configured to convert the generated answer into speech data.

A speech returning module that is configured to send the speech data back to the client.

Figure 10:
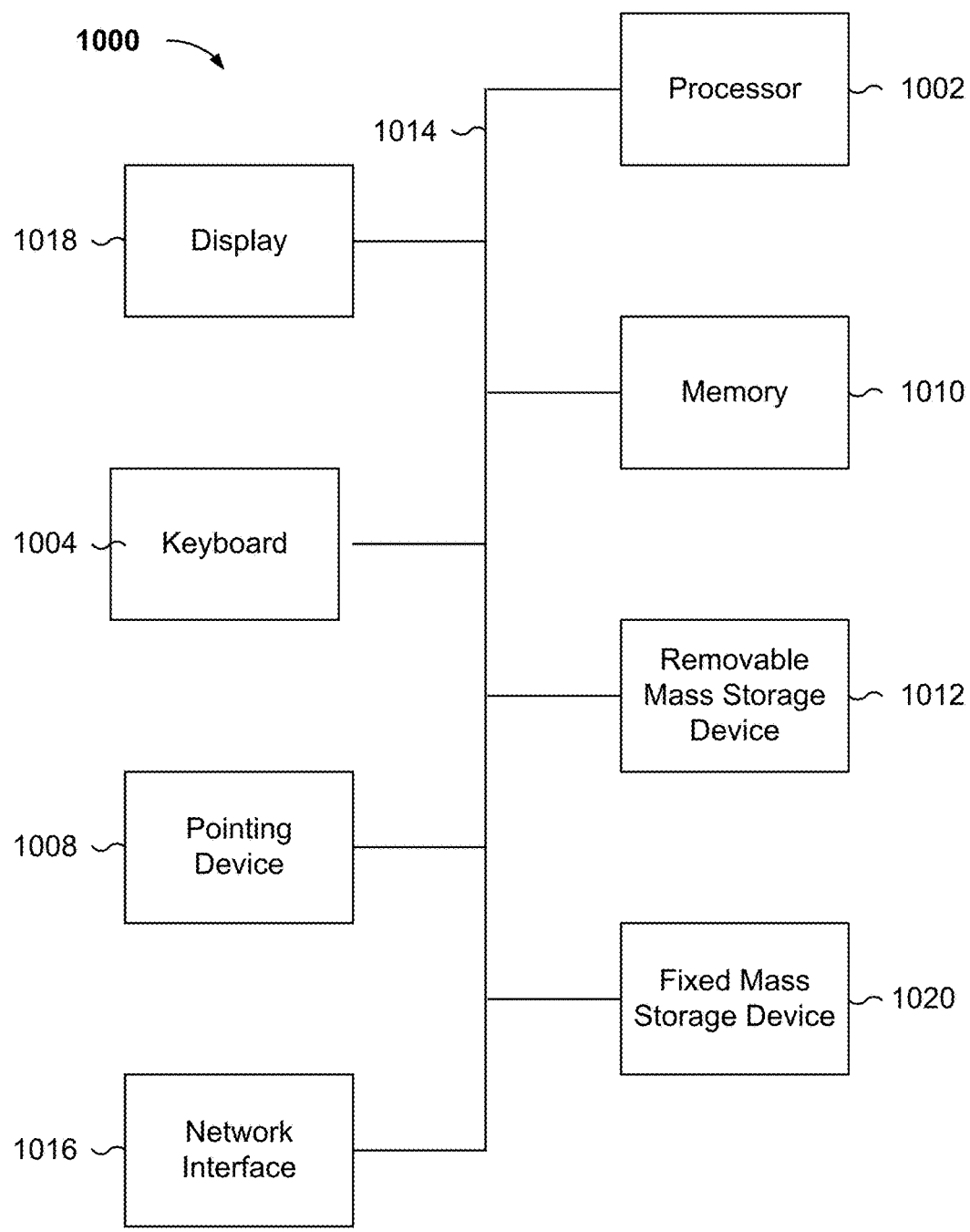
FIG. 10 is a functional diagram illustrating an embodiment of a programmed computer system for analyzing textual data.

FIG. 10 is a functional diagram illustrating an embodiment of a programmed computer system for analyzing textual data. As will be apparent, other computer system architectures and configurations can be used to analyze textual data. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer readable storage media, described below, depending on whether, for example, data access needs to be bi-directional or uni-directional. For example, processor 1002 can also directly and very rapidly retrieve and store frequently needed data in a cache memory (not shown).

A removable mass storage device 1012 provides additional data storage capacity for the computer system 1000 and is coupled either bi-directionally (read/write) or uni-directionally (read only) to processor 1002. For example, storage 1012 can also include computer readable media such as magnetic tape, flash memory, PC-CARDS, portable mass storage devices, holographic storage devices, and other storage devices. A fixed mass storage 1020 can also, for example, provide additional data storage capacity. The most common example of fixed mass storage 1020 is a hard disk drive. Mass storages 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display 1018, a network interface 1016, a keyboard 1004, and a pointing device 1008, as well as an auxiliary input/output device interface, a sound card, speakers, and other subsystems as needed. For example, the pointing device 1008 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The embodiments included in this description are described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, embodiments of the present application may employ one or more forms of computer products that implement computer-operable storage media (including but not limited to magnetic disk storage devices, CD-ROMs, and optical storage devices) containing computer-operable computer code.

In one typical configuration, the computer equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media, (transitory media), such as modulated data signals and carrier waves.

The embodiments of the present application are described with reference to flowcharts and/or block diagrams based on methods, terminal equipment (systems), and computer program products of the embodiments of the present application. Please note that each flowchart and/or block diagram within the flowcharts and/or block diagrams and combinations of flowcharts and/or block diagrams within the flowcharts and/or block diagrams can be realized by computer commands. These computer program commands can be provided to the processors of general-purpose computers, specialized computers, embedded processor devices, or other programmable data processing terminals to produce a machine. The commands executed by the processors of the computers or other programmable data processing terminal equipment consequently give rise to devices for implementing the functions specified in one or more processes in the flowcharts and/or one or more blocks in the block diagrams.

These computer program commands can also be stored in computer-readable memory that can guide the computers or other programmable data processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data processing terminal equipment and made to execute a series of steps on the computers or other programmable data processing terminal equipment so as to give rise to computer-implemented processing. The commands executed on the computers or other programmable data processing terminal equipment thereby provide the steps of the functions specified in one or more processes in the flowcharts and/or one or more blocks in the block diagrams.

Although preferred embodiments of the present application have already been described, a person skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Moreover, the term "comprise" or "contain" or any of their variants are to be taken in their non-exclusive sense. Thus, processes, methods, things, or terminal devices that comprise a series of elements not only comprise those elements, but also comprise other elements that have not been explicitly listed or elements that are intrinsic to such processes, methods, things, or terminal devices. In the absence of further limitations, elements that are limited by the phrase "comprises a(n) . . . " do not exclude the existence of additional identical elements in processes, methods, things, or terminal devices that comprise the elements.

The above is a detailed description of a method for processing text information and a device for processing text information that are provided for the present application. This document applies specific examples in explicating the principles and implementation of the present application. The explanations of the above embodiments are only in order to aid understanding of the present application methods and their core concepts. Furthermore, persons with typical skill in the art can always modify specific implementations and scopes of the application in accordance with the concept of the present application. To summarize the above, the content of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for analogy analysis, comprising:
receiving textual data;
determining that the textual data is a candidate for analogy analysis based at least in part on at least a portion of the textual data matching an analogical question template;
extracting a source substantive from the textual data, wherein a substantive comprises a noun;
using, by a processor, the source substantive to determine a target substantive from a word vector model that is trained on a set of training data, wherein using the source substantive to determine the target substantive from the word vector model that is trained on the set of training data comprises:
using the word vector model to generate a source word vector corresponding to a first source substantive;
determining a set of candidate target substantives that is similar to the first source substantive based at least in part on comparing target word vectors corresponding to the set of candidate target substantives to the source word vector;
identifying a subset of the set of candidate target substantives that is associated with a same first substantive type as the first source substantive;
determining a set of computed target substantives from the first source substantive, a second source substantive from a plurality of source substantives, and the subset of the set of candidate target substantives;
identifying a subset of the set of computed target substantives that is associated with a same second substantive type as the second source substantive; and
selecting a candidate target substantive from the subset of the set of candidate target substantives and a computed target substantive from the subset of the set of computed target substantives, wherein selecting the candidate target substantive comprises determining a score corresponding to each pair of candidate target substantive and computed target substantive;
generating an answer comprising an analogy including the target substantive based at least in part on an analogical answer template corresponding to the analogical question template; and
outputting the answer.

2. The method of claim 1, further comprising:
receiving speech data; and
converting the speech data into the textual data.

3. The method of claim 1, wherein determining that the textual data is the candidate for analogy analysis comprises:
performing segmentation on the textual data to obtain a plurality of textual words;
comparing the plurality of textual words against one or more analogical question templates;
determining that at least some of the plurality of textual words match the analogical question template; and
determining that the matching analogical question template corresponds to the analogical answer template based on an established correspondence between the analogical question template and the analogical answer template.

4. The method of claim 1, further comprising generating the set of training data, including by crawling a plurality of webpages.

5. The method of claim 1,
wherein selecting comprises determining respective scores corresponding to pairs of candidate target substantives and computed target substantives.

6. The method of claim 1, wherein generating the answer comprises replacing a placeholder source substantive in the analogical answer template with the target substantive.

7. A system for analogy analysis, comprising:
a processor; and
a memory coupled with the processor, wherein the memory is configured to provide the processor with instructions which when executed cause the processor to:
receive textual data;
determine that the textual data is a candidate for analogy analysis based at least in part on at least a portion of the textual data matching an analogical question template;
extract a source substantive from the textual data, wherein a substantive comprises a noun;
use the source substantive to determine a target substantive from a word vector model that is trained on a set of training data, wherein to use the source substantive to determine the target substantive from the word vector model that is trained on the set of training data comprises to:
use the word vector model to generate a source word vector corresponding to a first source substantive;
determine a set of candidate target substantives that is similar to the first source substantive based at least in part on comparing target word vectors corresponding to the set of candidate target substantives to the source word vector;
identify a subset of the set of candidate target substantives that is associated with a same first substantive type as the first source substantive;
determine a set of computed target substantives from the first source substantive, a second source substantive from a plurality of source substantives, and the subset of the set of candidate target substantives;
identify a subset of the set of computed target substantives that is associated with a same second substantive type as the second source substantive; and
select a candidate target substantive from the subset of the set of candidate target substantives and a computed target substantive from the subset of the set of computed target substantives, wherein to select the candidate target substantive comprises to determine a score corresponding to each pair of candidate target substantive and computed target substantive;
generate an answer comprising an analogy including the target substantive based at least in part on an analogical answer template corresponding to the analogical question template; and
output the answer.

8. The system of claim 7, wherein the memory is configured to further provide the processor with instructions which when executed cause the processor to:
receive speech data; and
convert the speech data into the textual data.

9. The system of claim 7, wherein to determine that the textual data is the candidate for analogy analysis comprises to:
perform segmentation on the textual data to obtain a plurality of textual words;
compare the plurality of textual words against one or more analogical question templates;
determine that at least some of the plurality of textual words match the analogical question template; and
determine that the matching analogical question template corresponds to the analogical answer template based on an established correspondence between the analogical question template and the analogical template.

10. The system of claim 7, wherein to generate the set of training data includes crawling a plurality of webpages.

11. The system of claim 7,
wherein to select comprises to determine respective scores corresponding to pairs of candidate target substantives and computed target substantives.

12. The system of claim 7, wherein to generate the answer comprises to replace a placeholder source substantive in the analogical answer template with the target substantive.

13. A computer program product for analogy analysis, the computer program product being embodied in a non-transitory computer readable storage medium and comprising computer instructions for:
receiving textual data;
determining that the textual data is a candidate for analogy analysis based at least in part on at least a portion of the textual data matching an analogical question template;
extracting a source substantive from the textual data, wherein a substantive comprises a noun;
using the source substantive to determine a target substantive from a word vector model that is trained on a set of training data, wherein using the source substantive to determine the target substantive from the word vector model that is trained on the set of training data comprises:
using the word vector model to generate a source word vector corresponding to a first source substantive;
determining a set of candidate target substantives that is similar to the first source substantive based at least in part on comparing target word vectors corresponding to the set of candidate target substantives to the source word vector;
identifying a subset of the set of candidate target substantives that is associated with a same first substantive type as the first source substantive;
determining a set of computed target substantives from the first source substantive, a second source substantive from a plurality of source substantives, and the subset of the set of candidate target substantives;
identifying a subset of the set of computed target substantives that is associated with a same second substantive type as the second source substantive; and
selecting a candidate target substantive from the subset of the set of candidate target substantives and a computed target substantive from the subset of the set of computed target substantives, wherein selecting the candidate target substantive comprises determining a score corresponding to each pair of candidate target substantive and computed target substantive; and
generating an answer comprising an analogy including the target substantive based at least in part on an analogical answer template corresponding to the analogical question template; and
outputting the answer.

14. The computer program product of claim 13, wherein determining that the textual data is the candidate for analogy analysis comprises:
- performing segmentation on the textual data to obtain a plurality of textual words;
- comparing the plurality of textual words against one or more analogical question templates;
- determining that at least some of the plurality of textual words match the analogical question template; and
- determining that the matching analogical question template corresponds to the analogical answer template.

15. The method of claim 1, wherein outputting the answer comprises:
- converting the answer into speech data; and
- outputting the speech data.

16. The system of claim 7, wherein to output the answer comprises to:
- convert the answer into speech data; and
- output the speech data.

17. The computer program product of claim 13, wherein outputting the answer comprises:
- converting the answer into speech data; and
- outputting the speech data.

* * * * *

UNITED STATES PATENT AND TRADEMARK OFFICE
CERTIFICATE OF CORRECTION

PATENT NO. : 10,176,804 B2
APPLICATION NO. : 15/404855
DATED : January 8, 2019
INVENTOR(S) : Huixing Jiang et al.

It is certified that error appears in the above-identified patent and that said Letters Patent is hereby corrected as shown below:

In Column 26, Claim 9, Line 10, after "and the analogical", insert --answer--.

Signed and Sealed this
Twenty-eighth Day of May, 2019

Andrei Iancu
*Director of the United States Patent and Trademark Office*